US012645319B2

(12) United States Patent
Sato

(10) Patent No.: US 12,645,319 B2
(45) Date of Patent: Jun. 2, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Jun Sato, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/859,402

(22) Filed: Jul. 7, 2022

(65) Prior Publication Data

US 2023/0305651 A1 Sep. 28, 2023

(30) Foreign Application Priority Data

Mar. 22, 2022 (JP) ................................. 2022-045535

(51) Int. Cl.
*G06F 3/041* (2006.01)
*G06F 3/0482* (2013.01)
(Continued)

(52) U.S. Cl.
CPC .......... *G06F 3/0416* (2013.01); *G06F 3/0482* (2013.01); *G06F 3/04845* (2013.01);
(Continued)

(58) Field of Classification Search
CPC .. G06F 3/0416; G06F 3/0482; G06F 3/04845; G06F 3/04886;
(Continued)

(56) References Cited

U.S. PATENT DOCUMENTS 11,556,298 B1 * 1/2023 Seger, Jr. .............. G06F 3/0416
2014/0055399 A1 * 2/2014 Lee ........................ G06F 3/0227
345/173
(Continued)

FOREIGN PATENT DOCUMENTS

CA 2811517 A1 * 3/2012 ............. G06F 3/016
CA 3039347 A1 * 4/2018 ......... G02B 27/0093
(Continued)

OTHER PUBLICATIONS

Dec. 2, 2025 Office Action issued in Japanese Patent Application No. 2022-045535.
Feb. 17, 2026 Office Action issued in Japanese Patent Application No. 2022-045535.

*Primary Examiner* — Kwin Xie
(74) *Attorney, Agent, or Firm* — Oliff PLC

(57) ABSTRACT

An information processing apparatus includes a processor configured to: detect a state in which a finger of a user stays in space above one of multiple selection elements for a predetermined time or longer, the state being detected by using a touch panel, the multiple selection elements being displayed on the touch panel; and perform control of the touch panel when the state is detected, the control being performed to turn the selection element into a selected display form. The predetermined time is a period of time set to prevent the processor from turning a nontarget selection element of the selection elements into the selected display form when the finger of the user passes space above the nontarget selection element toward a target selection element of the selection elements.

20 Claims, 15 Drawing Sheets

(51) Int. Cl.
 *G06F 3/04845* (2022.01)
 *G06F 3/04886* (2022.01)
 *H04N 1/00* (2006.01)
 *H04N 1/44* (2006.01)

(52) U.S. Cl.
 CPC .................... *G06F 3/04886* (2013.01); *G06F 2203/04108* (2013.01); *H04N 1/00411* (2013.01); *H04N 1/00413* (2013.01); *H04N 1/00469* (2013.01); *H04N 1/4426* (2013.01); *H04N 2201/0094* (2013.01)

(58) Field of Classification Search
 CPC ...... G06F 2203/04108; H04N 1/00411; H04N 1/00413; H04N 1/00469; H04N 1/4426; H04N 2201/0094
 USPC ................................................. 345/173–174
 See application file for complete search history.

(56) References Cited

U.S. PATENT DOCUMENTS

| | | | | |
|---|---|---|---|---|
| 2014/0157201 | A1* | 6/2014 | Ronkainen | G06F 3/04817 |
| | | | | 715/835 |
| 2015/0301724 | A1* | 10/2015 | Thibadeau, Sr. | G06F 3/04847 |
| | | | | 715/765 |
| 2021/0097776 | A1* | 4/2021 | Faulkner | G06F 3/017 |
| 2021/0247896 | A1* | 8/2021 | Tanemura | G06F 3/0304 |
| 2022/0404925 | A1* | 12/2022 | Gray | G06F 3/04166 |

FOREIGN PATENT DOCUMENTS

| | | |
|---|---|---|
| JP | 2014-178768 A | 9/2014 |
| JP | 2019-109637 A | 7/2019 |
| JP | 2020167461 A | 10/2020 |

* cited by examiner

FIG. 4

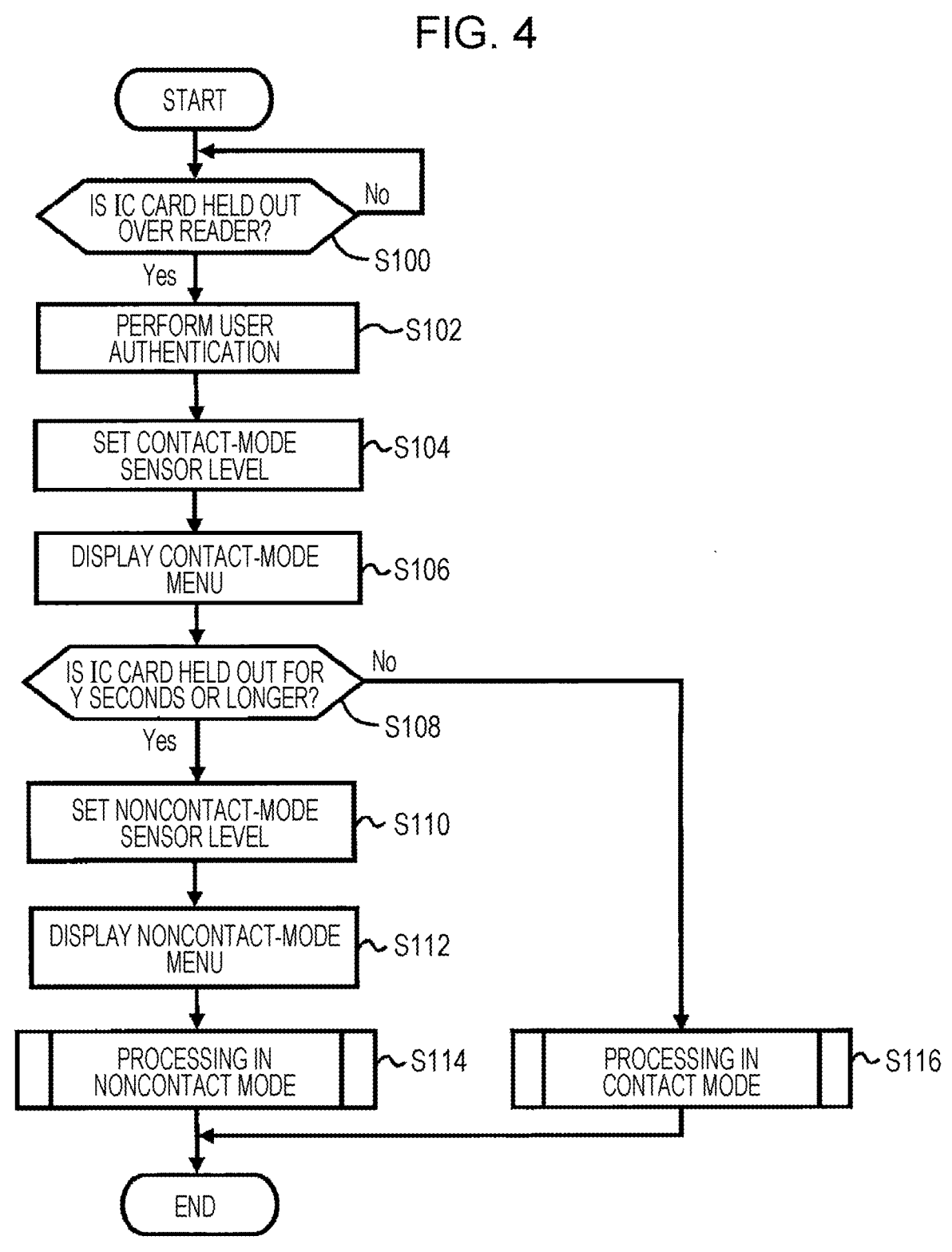

START

IS IC CARD HELD OUT OVER READER? — No ⟋ S100

Yes

PERFORM USER AUTHENTICATION — S102

SET CONTACT-MODE SENSOR LEVEL — S104

DISPLAY CONTACT-MODE MENU — S106

IS IC CARD HELD OUT FOR Y SECONDS OR LONGER? — No — S108

Yes

SET NONCONTACT-MODE SENSOR LEVEL — S110

DISPLAY NONCONTACT-MODE MENU — S112

PROCESSING IN NONCONTACT MODE — S114

PROCESSING IN CONTACT MODE — S116

END

<CONTACT MODE>

<NONCONTACT MODE>

UNSELECTED                DEFINITIVELY SELECTED

FIG. 15

| | CONTACT MODE | NONCONTACT MODE (PRINT JOB ABSENT) | NONCONTACT MODE (PRINT JOB PRESENT) |
|---|---|---|---|
| DEFAULT | | | |
| USER A | | | |
| USER B | | | |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-045535 filed Mar. 22, 2022.

BACKGROUND

(i) Technical Field

The present disclosure relates to an information processing apparatus, a non-transitory computer readable medium, and an information processing method.

(ii) Related Art

To date, various information processing apparatuses including a touch panel are known.

Japanese Unexamined Patent Application Publication No. 2019-109637 discloses a non-contact input device enabling information to be input without a finger of a user directly touching the displaying surface of a display. The information is input in such a manner that a real image of the display formed in the air to serve as an areal image is displayed and that the user's finger on the detection plane corresponding to the image plane of the areal image is detected.

SUMMARY

Conceivable ways of enabling a touch panel operation without directly touching a touch panel include using a touch sensor with a high detection sensitivity and setting a higher detection sensitivity on an existing touch sensor. However, the touch sensor with the high detection sensitivity is likely to wrongly detect a selection element different from a target selection element (for example, an icon) displayed on the touch panel, the selection element being located below a passage of a moving finger of a user.

Aspects of non-limiting embodiments of the present disclosure relate to enabling a target selection element to be selected in operating a touch panel.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: detect a state in which a finger of a user stays in space above one of multiple selection elements for a predetermined time or longer, the state being detected by using a touch panel, the multiple selection elements being displayed on the touch panel; and perform control of the touch panel when the state is detected, the control being performed to turn the selection element into a selected display form, wherein the predetermined time is a period of time set to prevent the processor from turning a nontarget selection element of the selection elements into the selected display form when the finger of the user passes space above the nontarget selection element toward a target selection element of the selection elements.

BRIEF DESCRIPTION OF THE DRAWINGS

Exemplary embodiments of the present disclosure will be described in detail based on the following figures, wherein:

FIG. 4 is a flowchart illustrating a process for selecting a contact mode or a noncontact mode;

FIG. 15 is a view illustrating an example of customizing the touch panel displaying.

DETAILED DESCRIPTION

Overview and Definitions

Figure 1:
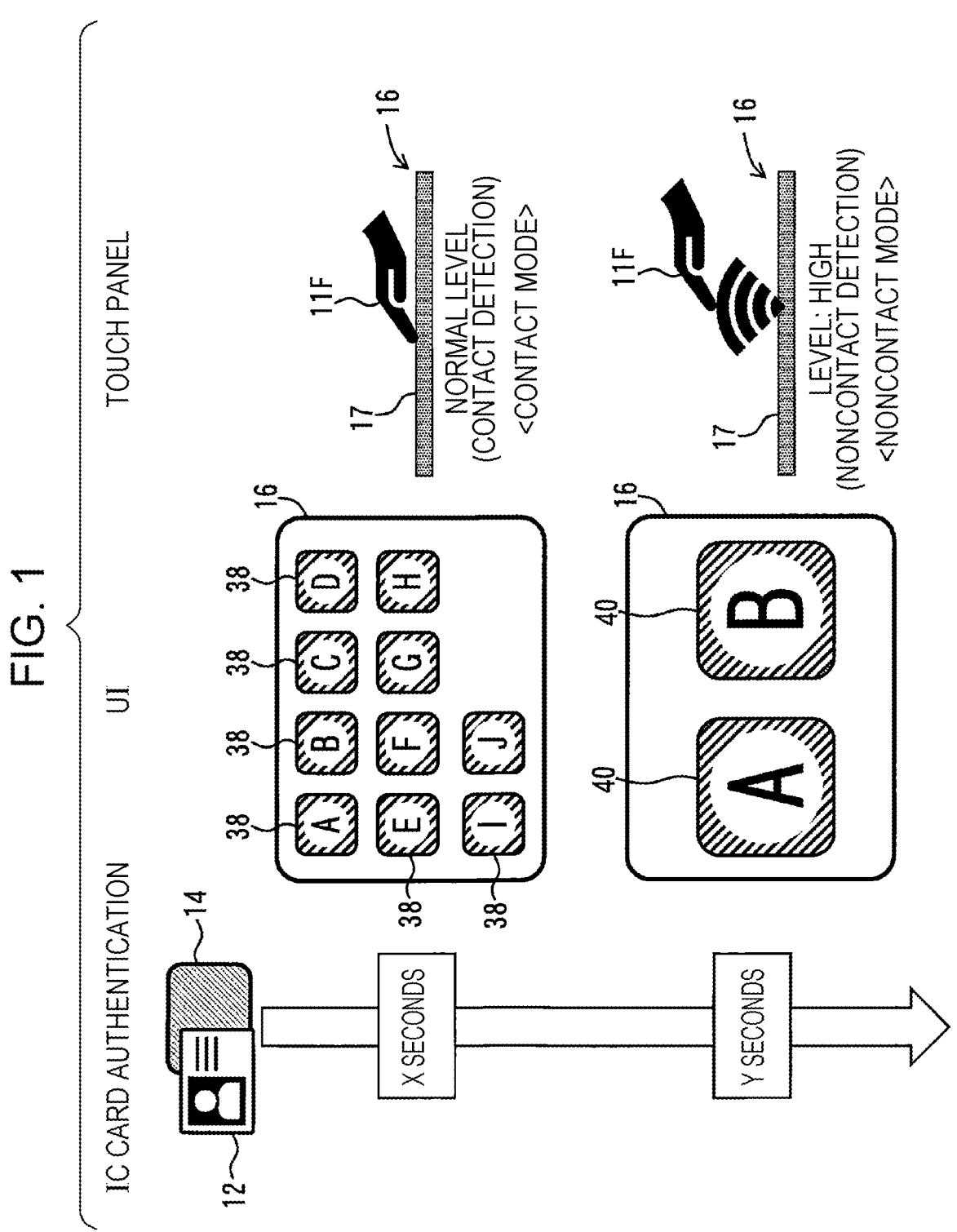
FIG. 1 is a view for explaining a contact mode and a noncontact mode.

Hereinafter, exemplary embodiments according to the present disclosure will be described in detail with reference to the attached drawings. The configurations described below are provided for exemplary purposes and may be appropriately changed according to the specifications and the like of an information processing apparatus. When the following description includes multiple exemplary embodiments, a modification, and the like, it is originally assumed that characteristic parts thereof are appropriately combined in using the characteristic parts. The same components are denoted by the same reference numerals throughout the drawings, and repeated description is omitted.

According to each exemplary embodiment according to the present disclosure, by using a touch panel including a touch sensor with a high detection sensitivity, a finger of a user may be detected in space above the touch panel, and the user operates the touch panel without touching the touch panel. The touch sensor detects the user's finger, for example, several millimeters above the surface of the touch panel. However, the touch sensor may detect the user's finger a longer distance away from the surface of the touch panel.

An information processing apparatus includes the touch panel integrated therein or separated therefrom. The information processing apparatus receives information input from the user through a touch panel operation by the user. The exemplary embodiment according to the present disclosure may be used for a known information processing apparatus including a touch panel. The information processing apparatus may be, for example, a smartphone, a tablet, a MFP, an ATM of a bank, a ticket machine, or a payment machine.

In the exemplary embodiment according to the present disclosure, a processor detects a finger stay state by using the touch panel. In the finger stay state, the user's finger stays in the space above one of selection elements displayed on the touch panel, for a predetermined time or longer. The processor performs control of the touch panel when the finger stay state is detected. The control is performed to cause the selection element below the user's finger to enter into a selected display state indicating that the selection element is selected. In a different exemplary embodiment according to the present disclosure, the processor may be configured to, in response to the detection of the finger stay state, consider that the selection element below the user's finger is definitively selected and receive an instruction for the selection element. The selection elements are, for example, icons 40 illustrated in FIG. 1 and the like but are not limited to the icons 40. Each selection element is an object to be selected that is displayed on the touch panel. The selection element may be a known object to be selected that is displayed on the touch panel. The selection elements may be, for example, a button, a checkbox, a radio button, a pulldown menu, and numeric keys on the ten-key pad.

In the exemplary embodiment according to the present disclosure, the criterion for the finger stay state "predetermined time" is a period of time set to prevent the processor from wrongly causing a nontarget selection element to enter into the selected display state when the user's finger passes space above the nontarget selection element toward a target selection element. The target selection element is a selection element intended to be selected by the user, while the nontarget selection element is a selection element not intended to be selected by the user. The predetermined time may be, for example, about one to two seconds but is not limited to this period of time. The predetermined time may be set, for example, shorter for a young user who quickly moves a finger above the touch panel and longer for a user who moves a finger slowly, such as a handicapped person or an elderly person. Discrimination of a user as described above may be performed by using a reader (described later). The reader may read information regarding the age or the like of the user from a storage medium such as an IC card.

In the exemplary embodiment according to the present disclosure, the information processing apparatus may have both of a contact mode and a noncontact mode. As illustrated in FIG. 1, the contact mode is a mode in the related art in which the user touches a touch panel 16 for a screen operation. The noncontact mode is a feature of the present disclosure and is a mode in which a selection element turns into a selected display form without a touch on the screen and in which the detection sensitivity for the user's finger is higher than that in the contact mode. The noncontact mode is a mode in which a screen operation is performed in such a manner that a finger 11F of the user is held in the space above the touch panel 16 for the predetermined time or longer (the finger stay state is established) without the user's touch on the touch panel 16.

Selecting the contact mode or the noncontact mode may be performed by using a storage medium (such as an IC card). For example, as illustrated in FIG. 1, if a storage medium 12 is held out over a reader 14 for a period of time (for example, X seconds) shorter than a predetermined holding-out time (Y seconds), the information processing apparatus operates in the contact mode. If the storage medium 12 is held out for the predetermined holding-out time (Y seconds) or longer, the information processing apparatus operates in the noncontact mode. In this case, the contact mode and the noncontact mode may have an opposite relationship (the noncontact mode for the period of time shorter than Y seconds and the contact mode for Y seconds or longer). Alternatively, every time the storage medium is held out over the reader, the contact mode and the noncontact mode may be toggled.

The storage medium is, for example, an IC card having a RF tag but is not limited to the IC card. The storage medium is an object recognizable by the reader when being held out over the reader. The storage medium may be an IC card storing user identification information or the like, an electronic tag, a smartphone, a smart watch, or the like. The IC card may be an ID card, a cash card of a bank, a credit card, a card storing electronic money (for example, an IC card railway ticket), or the like. The storage medium may be an object carried with the user.

The reader is equipment integrated into or connected to the information processing apparatus. The reader is, for example, a radio frequency identifier (RFID) reader but is not limited to the RFID reader. The reader is equipment that recognizes a storage medium when the storage medium is held out over the reader. For example, the reader communicates with a device such as a RF tag in the storage medium to thereby recognize that the storage medium is held out over the reader.

The information processing apparatus may perform user authentication in response to the reader reading user identification information in the storage medium. The user authentication is not necessarily required in the exemplary embodiments (described later) but enables, for example, the screen of the touch panel to be varied on a per-user basis (see FIG. 15). The information processing apparatus performs the user authentication, for example, when the storage medium is held out over the reader. The information processing apparatus may also continue the user authentication while the storage medium is being held out over the reader. The term "holding out the storage medium over the reader" denotes bringing the storage medium into contact with the reader (contact) or bringing the storage medium close to the reader (noncontact).

MFP Configuration

Figure 2:
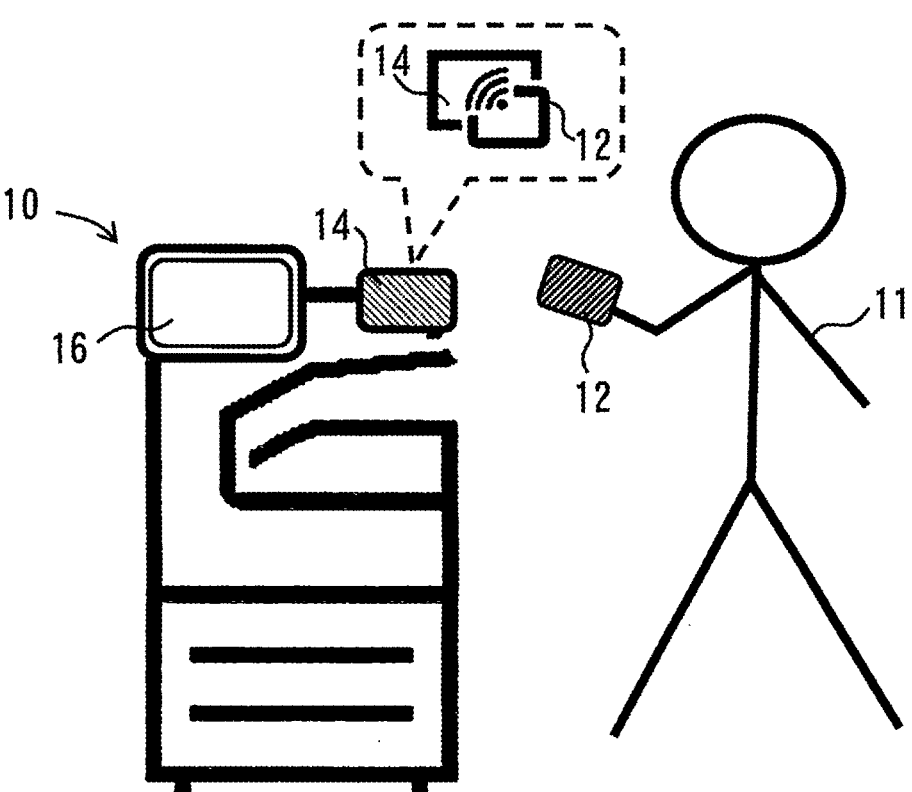
FIG. 2 is a view schematically illustrating a multifunction printer (MFP) taken as an example of an information processing apparatus.

Hereinafter, exemplary embodiments of an MFP taken as an example of the information processing apparatus will be described. FIG. 2 is a view schematically illustrating a MFP 10. The MFP 10 is an information processing apparatus having a copying function, a scanning function, a printing function, a faxing function, and the like. The MFP 10 includes the reader 14 and the touch panel 16. The reader 14 is a RFID reader and reads user identification information from the reader 14 when the IC card 12 is held out over the reader 14. The MFP 10 performs user authentication when the IC card 12 is held out over the reader 14. The touch panel 16 is an input unit that receives various instructions from the user and is also a display that displays various pieces of information.

The IC card 12 is a storage medium including a RF tag, and the RF tag stores the user identification information. The IC card 12 is, for example, an ID card carried with the user.

Figure 3:
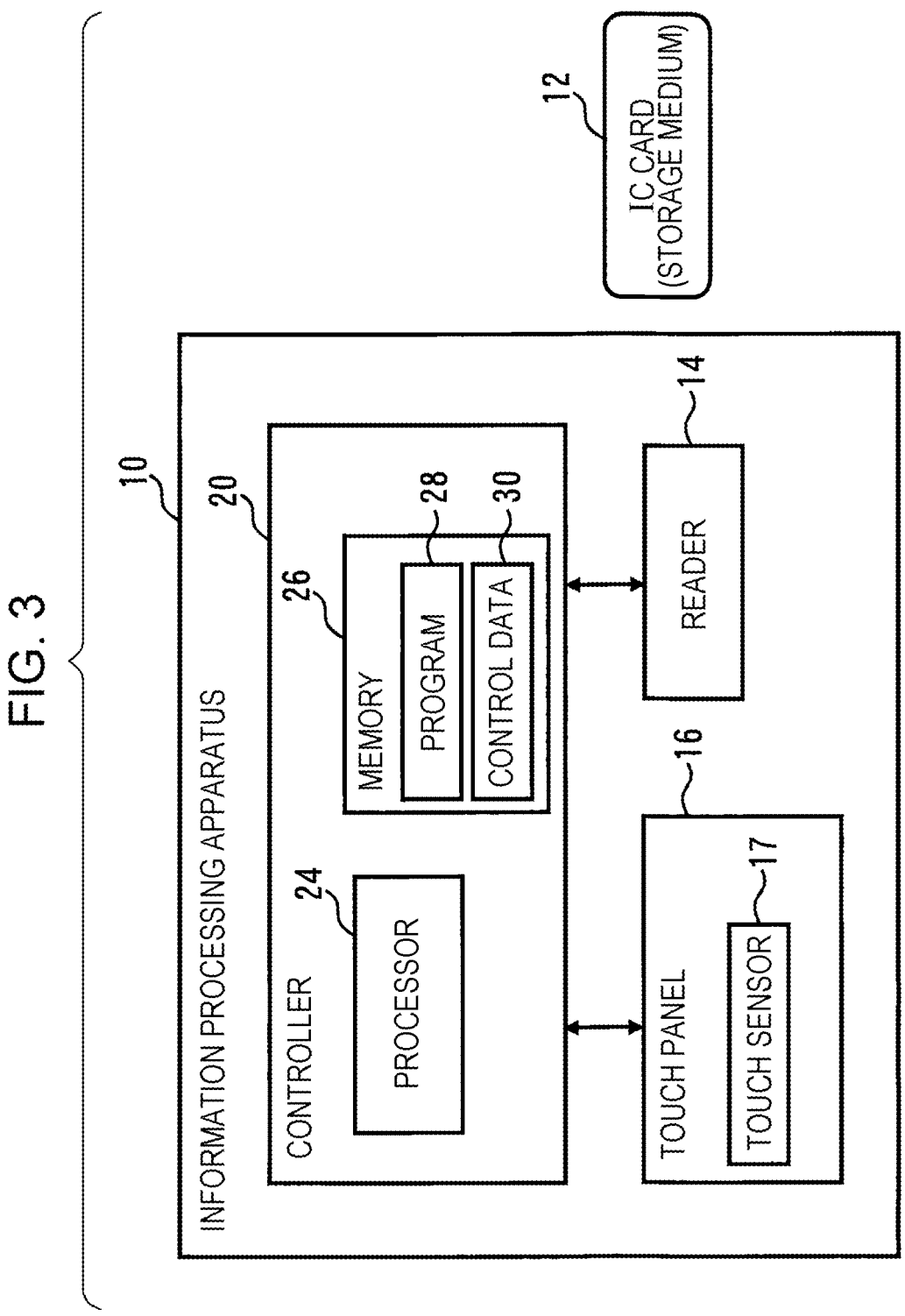
FIG. 3 is a functional block diagram of the information processing apparatus and illustrates only a portion according to an exemplary embodiment.

FIG. 3 is a functional block diagram of the MFP 10 and illustrates only a portion according to the exemplary embodiment. FIG. 3 is also a functional block diagram of a different information processing apparatus.

The MFP 10 includes a controller 20, the touch panel 16, and the reader 14. The controller 20 includes a processor 24 and a memory 26. The processor 24 includes a CPU and performs information processing in accordance with a program 28 installed on the MFP 10 and control data 30. The processor 24 may be defined as a computer in a narrow sense.

The memory 26 is a ROM, a RAM, a flash memory, a hard disk, or the like. The memory 26 stores the program 28 and the control data 30. The program 28 and the control data 30 may be provided not only through a network such as the Internet as a matter of course but also in such a manner as to be stored in a computer readable recording medium such as an optical disk or a USB memory.

The touch panel 16 includes a touch sensor 17. The touch sensor 17 detects the user's finger brought into contact with the surface of the touch panel 16 or present in the space above the touch panel 16. The touch sensor 17 has a function by which the sensitivity (sensor level) for detecting the user's finger may be changed and is operable in the contact mode (sensor level: low (normal)) and in the noncontact mode (sensor level: high). In the contact mode, the touch sensor 17 is capable of detecting the user's finger in contact with the surface of the touch panel 16. In the noncontact mode, the touch sensor 17 is capable of detecting the user's finger not in contact with the surface of the touch panel 16 but present in the space above the touch panel 16.

The touch panel 16 and the reader 14 are connected to the controller 20 to enable communication therewith. By using the reader 14, the processor 24 of the controller 20 detects holding out of the IC card 12 over the reader 14 and the moving of the IC card 12 thereafter away from the reader 14. The processor 24 also receives information input by the user with the touch panel 16 and controls displaying on the touch panel 16. The processor 24 also controls the detection sensitivity (sensor level) of the touch sensor 17.

Selecting Contact Mode or Noncontact Mode

Selecting the contact mode or the noncontact mode will then be described. FIG. 4 is a flowchart illustrating a process for selecting the contact mode or the noncontact mode. Hereinafter, the flowchart in FIG. 4 will be described.

In step S100, the processor 24 of the MFP 10 determines whether the IC card 12 is held out over the reader 14. If the result of step S100 is Yes (the IC card 12 is held out over the reader 14), the processor 24 proceeds to step S102. In step S102, the processor 24 performs user authentication by using the user identification information read from the IC card 12 by the reader 14.

In step S104, the processor 24 sets normal (for the contact mode) as the sensor level of the touch sensor 17. In step S106, the processor 24 performs control to display a menu for the contact mode on the touch panel 16. An example of touch panel displaying in the contact mode is schematically illustrated in the upper central part of FIG. 1.

In step S108, the processor 24 determines whether the IC card 12 is held out for Y seconds or longer if the result of step S100 is Yes. If the result of step S108 is No (a period of time shorter than Y seconds), the processor 24 performs processing in the contact mode in step S116. In the processing in the contact mode, receiving of a user operation of the known touch panel 16 and displaying thereon are performed.

In contrast, if the result of step S108 is Yes (Y seconds or longer), the processor 24 proceeds to step S110. In step S110, the processor 24 sets high (for the noncontact mode) as the sensor level of the touch sensor 17. In step S112, the processor 24 performs control to display a menu for the noncontact mode on the touch panel 16. An example of the touch panel displaying in the noncontact mode is schematically illustrated in the lower central part of FIG. 1. In step S114, the processor 24 performs the processing in the noncontact mode. The processing in the noncontact mode will be described later by using FIG. 5. Here, the description of the process for selecting the contact mode or the noncontact mode is completed.

Figure 8:
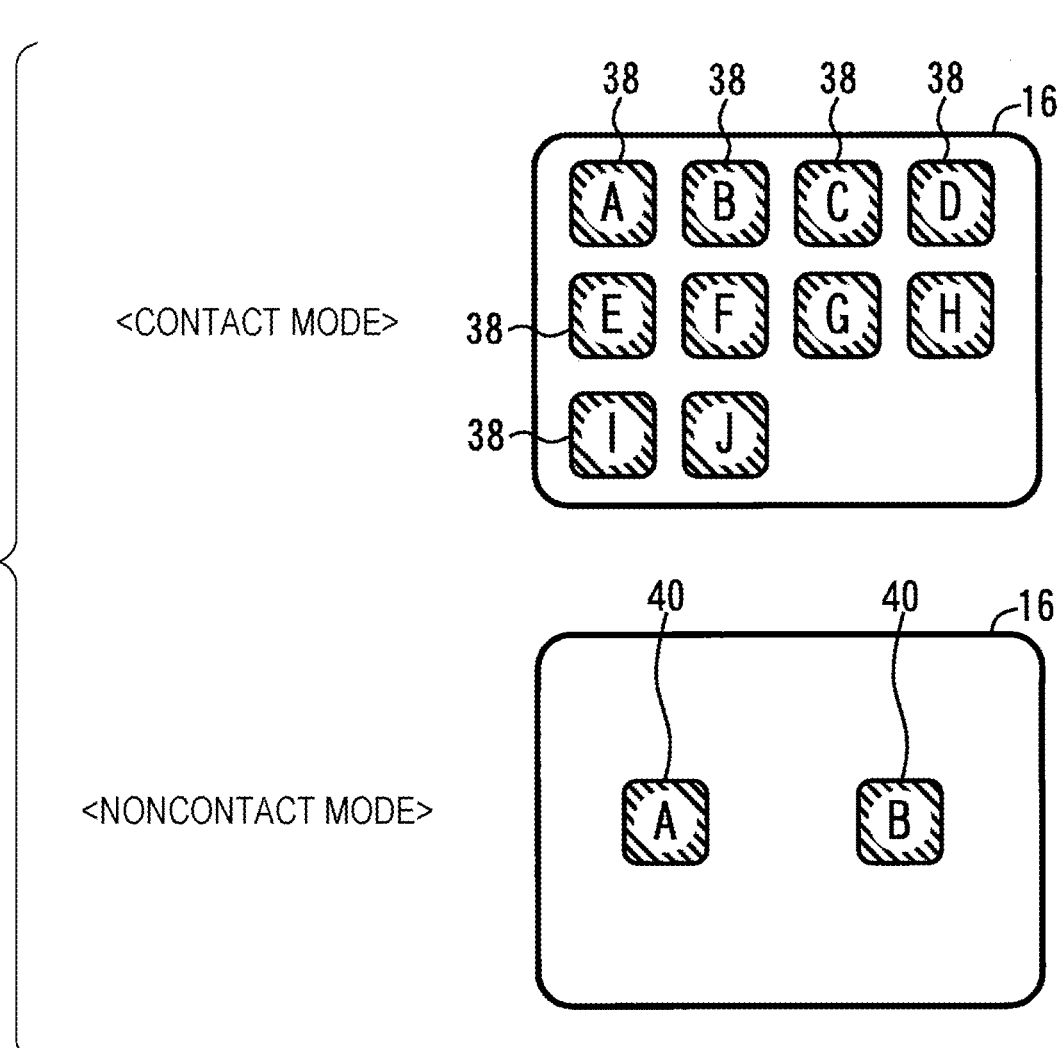
FIG. 8 is a view illustrating an example of touch panel displaying in the noncontact mode.

The characteristics of the contact mode and the touch panel displaying in the noncontact mode will be described. As illustrated in the lower right part of FIG. 1, since the finger 11F of the user is present in the space above the touch sensor 17 in the noncontact mode, only rough detection is possibly available in detecting the location of the finger 11F of the user above the two-dimensional plane (surface) of the touch panel 16. Hence, as illustrated in the lower central part of FIG. 1, the icons 40 to be displayed on the touch panel 16 are made larger in the noncontact mode than in the contact mode to prevent wrong detection. In a different exemplary embodiment, as illustrated in FIG. 8, a distance between the two icons 40 may be displayed on the touch panel 16 is made longer in the noncontact mode than in the contact mode to prevent the wrong detection. In the exemplary embodiment in FIG. 8, icons 38 in the contact mode and the icons 40 in the noncontact mode may have identical sizes. Although FIG. 1 and figures to be described later illustrate the example of the two icons 40 displayed on the touch panel 16 in the noncontact mode, the number of icons 40 may naturally be a different number.

Processing in Noncontact Mode

Figure 5:
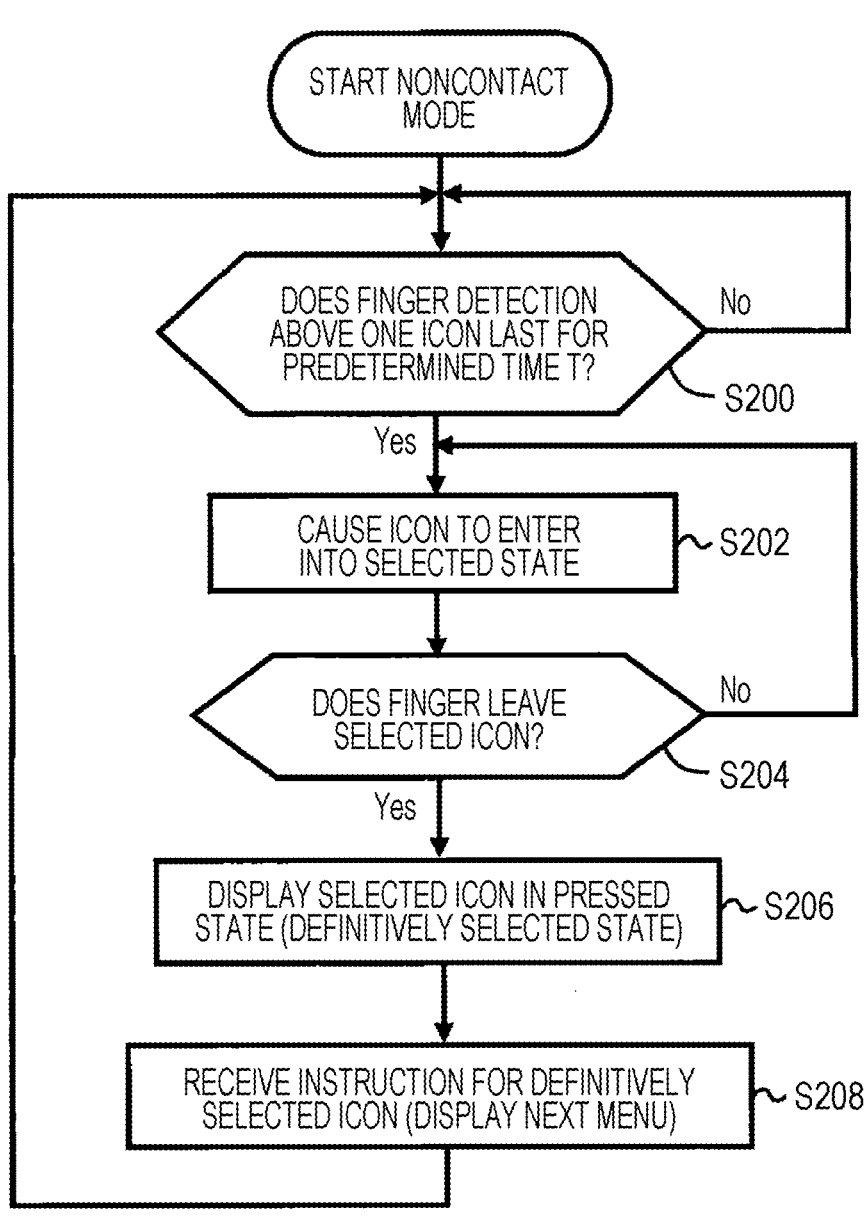
FIG. 5 is a flowchart illustrating processing in the noncontact mode.
Figure 6:
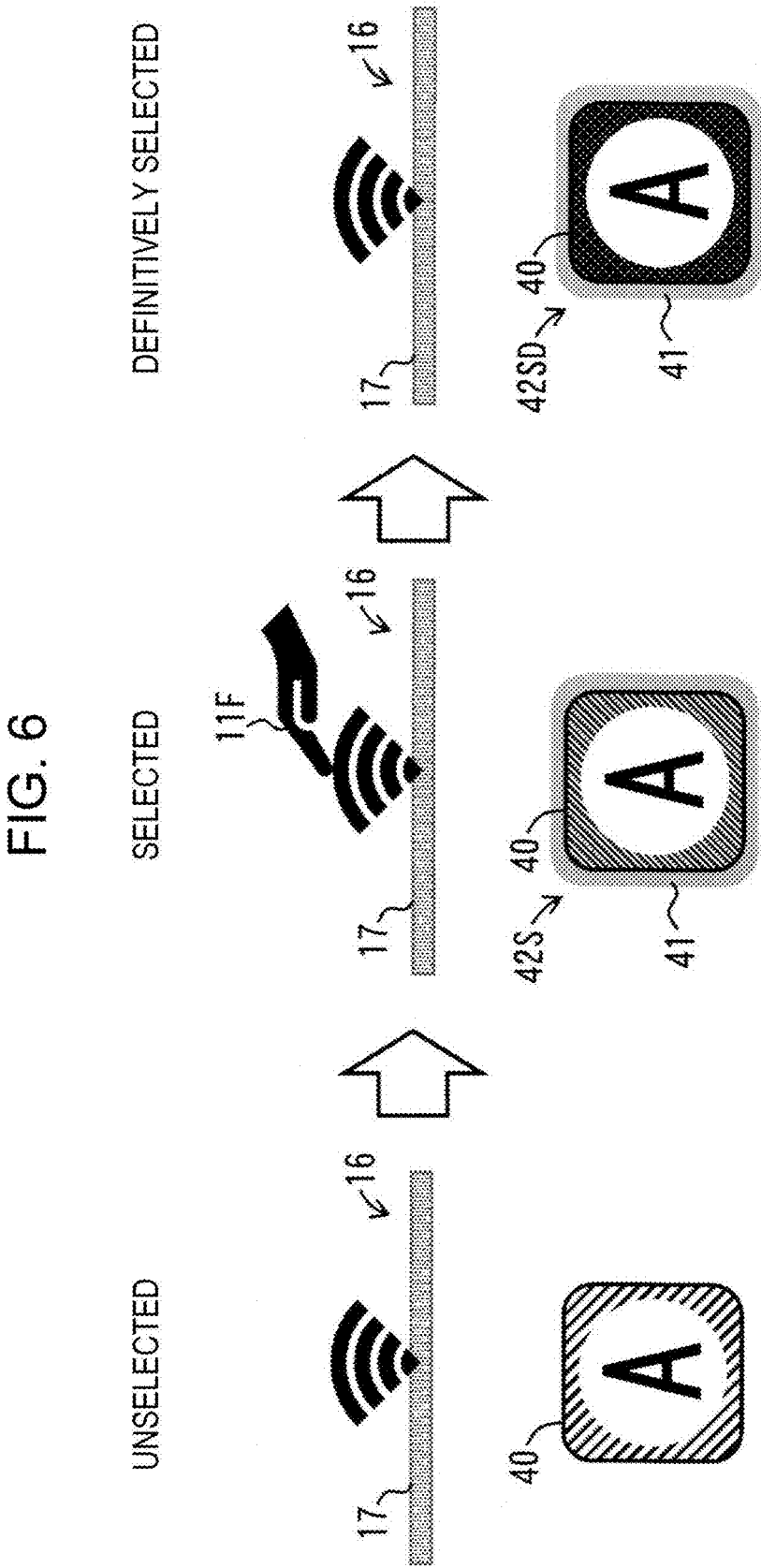
FIG. 6 is a view for explaining a selected state and a definitively selected state of an icon in the noncontact mode.
Figure 7:
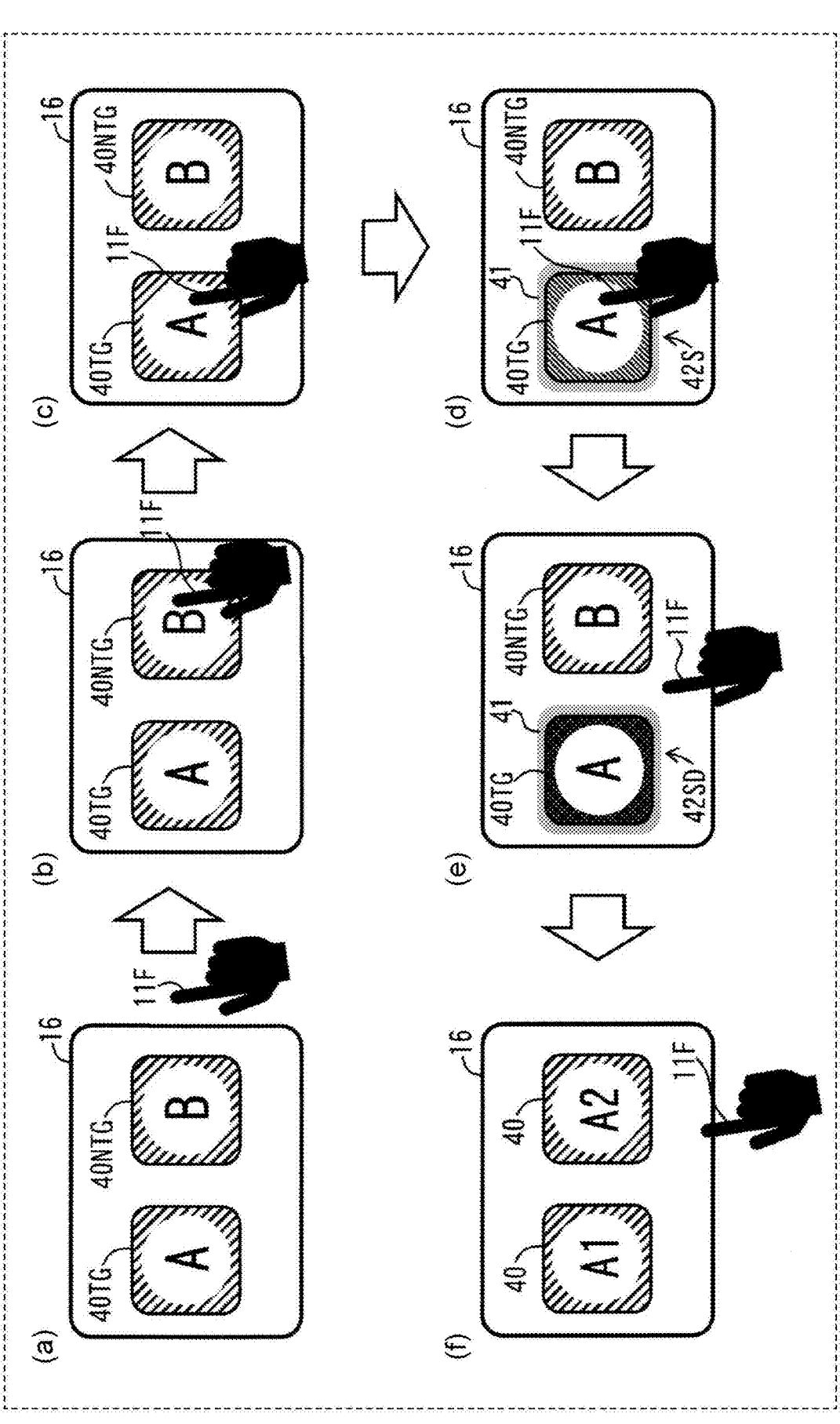
FIG. 7 is a view for explaining touch panel operations in the noncontact mode.

The processing in the noncontact mode will then be described. FIG. 5 is a flowchart illustrating the processing in the noncontact mode. FIG. 6 is a view for explaining a selected state 42S and a definitively selected state 42SD of the icon 40 in the noncontact mode. FIG. 7 is a view for explaining touch panel operations in the noncontact mode.

The flowchart in FIG. 5 will be described. In step S200 in FIG. 5, the processor 24 of the MFP 10 determines whether the detection of the finger 11F of the user above the area of the one of the icons 40 displayed on the touch panel 16 lasts for a predetermined time T (the finger stay state is detected). If the result of step S200 is Yes (the finger stay state is detected), the processor 24 performs control of the touch panel 16 in step S202 to cause the icon 40 below the finger 11F of the user to enter into the selected display state 42S (hereinafter, also referred to as the selected state 42S or a selected display form 42S).

FIG. 7 illustrates, in parts (a) to (e) therein, a state in which a target icon 40TG serving as the target selection element and a nontarget icon 40NTG serving as the nontarget selection element are displayed on the touch panel 16. As illustrated in the parts (a) to (d) in FIG. 7, the finger 11F of the user passes through space above the nontarget icon 40NTG to reach the target icon 40TG. The predetermined time T mentioned above is a period of time (for example, about one to two seconds) set to prevent the processor 24 from wrongly causing the nontarget icon 40NTG to enter into the selected display state when the finger 11F of the user passes the space above the nontarget icon 40NTG.

FIG. 6 illustrates an unselected state, the selected state 42S, and the definitively selected state 42SD (described later) of one of the icons 40 in this order from the left to the right. In this exemplary embodiment, the selected state 42S is a display state in which a frame-shaped selection mark 41 is disposed to surround the icon 40, and the color of the icon 40 is changed from that of the unselected state. The selection mark 41 is a display object filled with a noticeable color (such as red or blue). The selection mark 41 may blink at predetermined time intervals. Various known display forms indicating that the selection element is selected may be used for the selected state 42S. The selected state 42S may also be a display state in which only disposing the selection mark 41 is performed without changing the color of the icon 40 from that in the unselected state. The selected state 42S may also be a display state in which the color of the icon 40 is changed from that in the unselected state without disposing the selection mark 41.

FIG. 7 illustrates the target icon 40TG in the selected state 42S in the part (d). In this state, the finger 11F of the user is present in the space above the icon 40TG. Hereinafter, the icon 40 in the selected state 42S is referred to as a selected icon.

In step S204 in FIG. 5 (after the icon 40 enters into the selected state), the processor 24 determines whether the finger 11F of the user leaves the space above the selected icon. If the result of step S204 is No (the finger 11F does not leave the space), the processor 24 keeps the icon 40 in the selected state 42S (step S202).

In contrast, if the result of step S204 is Yes (the finger 11F leaves the selected icon), the processor 24 sets the selected icon in the definitively selected state 42SD in step S206. FIG. 6 illustrates the definitively selected state 42SD of the icon 40 in the right part in FIG. 6. In this exemplary embodiment, the definitively selected state 42SD is a display state in which the color of the icon 40 is changed from the color of the selected state 42S. Various known display forms indicating that the selection element is definitively selected may be used for the definitively selected state 42SD. For the definitively selected state 42SD, for example, a display state in which an icon is pressed on the known touch panel 16 may be used. The definitively selected state 42SD may also be a display state in which the color of the selection mark 41 is changed without changing the color of the icon 40 from the color of the selected state 42S. The definitively selected state 42SD may also be a display state in which the color of the icon 40 is changed from the color of the selected state 42S and the color of the selection mark 41 is also changed.

FIG. 7 illustrates the target icon 40TG in the definitively selected state 42SD in the part (e). In this state, the finger 11F of the user has left the space above the icon 40TG. Hereinafter, the icon 40 in the definitively selected state 42SD is also referred to as a definitively selected icon.

In step S208 in FIG. 5 (after the icon 40 enters into the definitively selected state 42SD), the processor 24 receives an instruction for the definitively selected icon. For example, if icons A and B in the parts (a) to (e) in FIG. 7 are icons (such as Copy, Scan, and Print) for selecting a function of the MFP 10, the processor 24 receives an instruction to display a settings menu for the definitively selected icon (for example, Copy). The processor 24 then performs control to display the settings menu and returns to step S200. The processor 24 performs steps S200 to S208 also for the settings menu. FIG. 7 illustrates, in the part (f), the icons 40 representing the next menu (for example, a settings menu).

For example, if the icons A and B in the parts (a) to (e) in FIG. 7 are icons for staring a function of the MFP 10 (such as Start Copy, Start Scan, and Start Print), the processor 24 receives an instruction to start a function (for example, copying) corresponding to the definitively selected icon (for example, Start Copy) and performs control to execute the function.

In FIG. 5 (in the processing in the noncontact mode), in response to the processor 24 detecting the IC card 12 held out over the reader 14, the mode of the touch panel 16 may be switched from the noncontact mode to the contact mode. In the processing in the contact mode, in response to the processor 24 detecting the IC card 12 held out over the reader 14, the mode of the touch panel 16 may be switched from the contact mode to the noncontact mode.

According to the exemplary embodiment described above, in the noncontact mode, the target icon 40TG may be selected without the finger 11F of the user touching the surface of the touch panel 16.

Processing in Noncontact Mode according to Different Exemplary Embodiment

Figure 9:
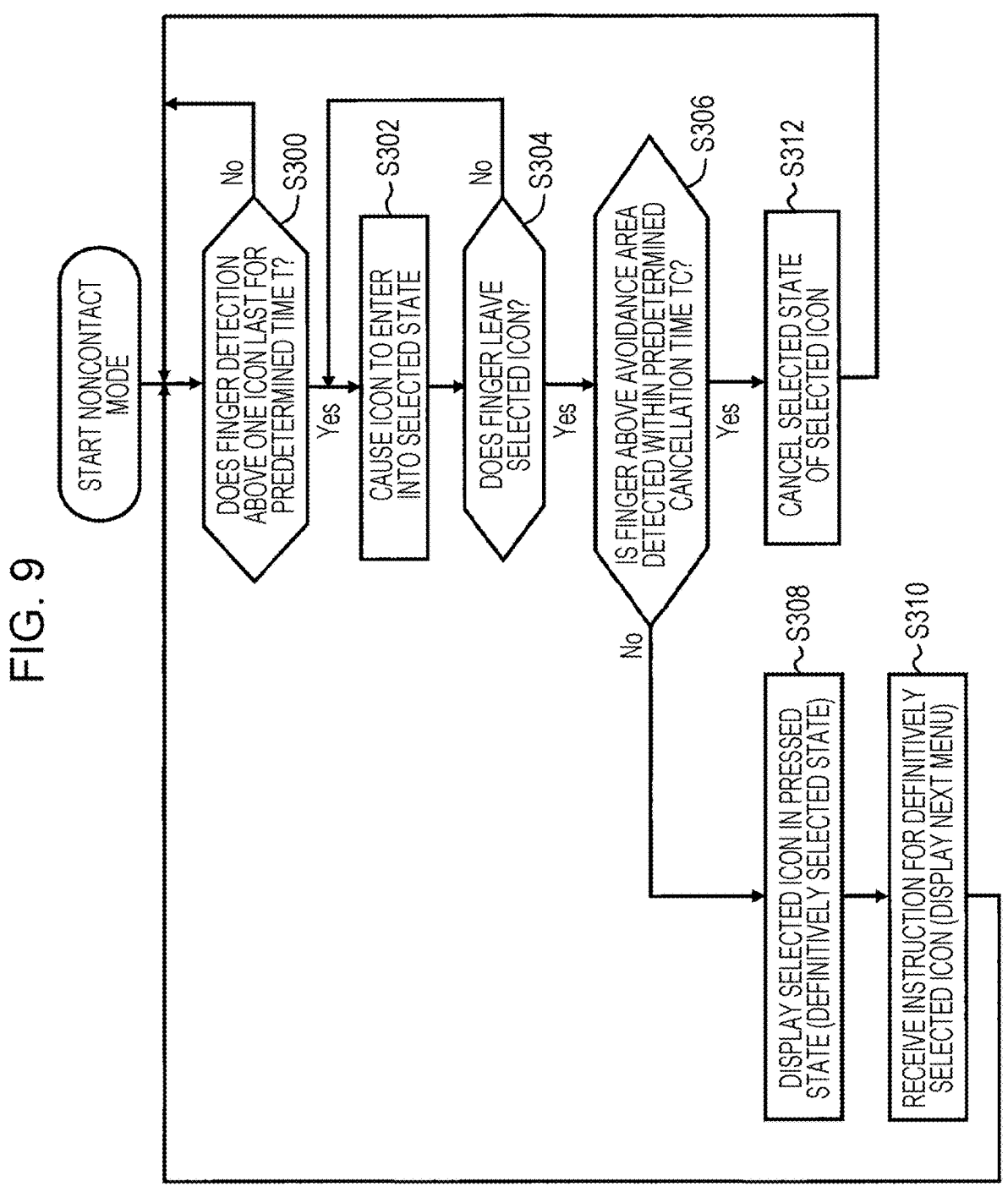
FIG. 9 is a flowchart illustrating processing in the noncontact mode according to a different exemplary embodiment.
Figure 10:
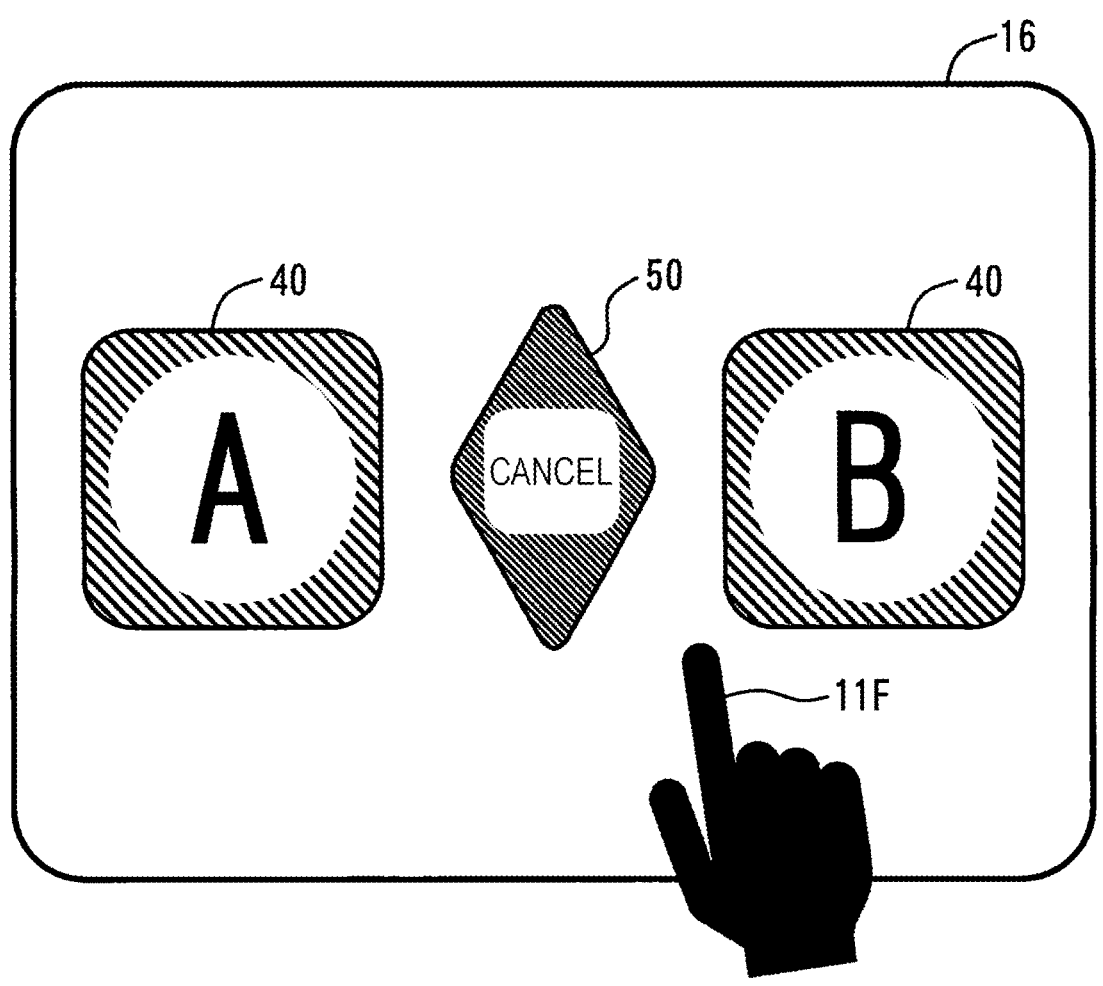
FIG. 10 is a view illustrating an example of touch panel displaying in the noncontact mode according to the different exemplary embodiment.
Figure 11:
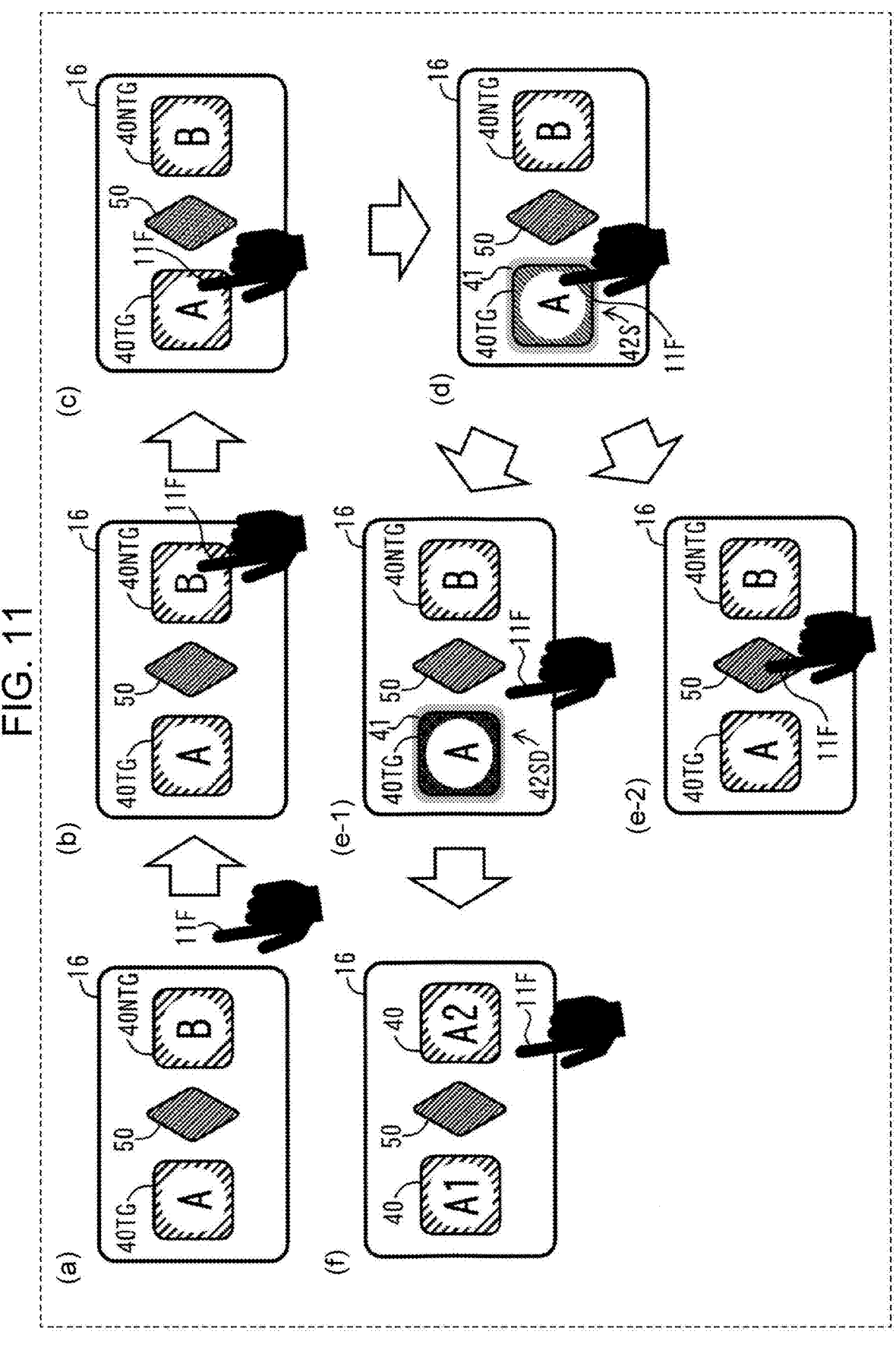
FIG. 11 is a view for explaining touch panel operations in the noncontact mode according to the different exemplary embodiment.

Processing in the noncontact mode according to a different exemplary embodiment will then be described. FIG. 9 is a flowchart illustrating the processing in the noncontact mode according to the different exemplary embodiment. FIG. 10 is a view illustrating an example of touch panel displaying in the noncontact mode. FIG. 11 is a view for explaining touch panel operations in the noncontact mode.

In this exemplary embodiment, an avoidance area 50 (see FIG. 10, also referred to as a cancellation area 50) is newly provided as compared with the exemplary embodiment in FIG. 7. The avoidance area 50 is a display object disposed between the two icons 40 and is an area for canceling the selected state 42S of any of the icons 40. For example, if the user unintentionally causes one of the icons 40 to enter into the selected state 42S, the selected state 42S of the icon 40 may be cancelled by moving the finger 11F to the space above the avoidance area 50. The shape of the avoidance area 50 is not limited, but as illustrated in FIG. 10, shaping the avoidance area 50 into, for example, a diamond prevents the finger 11F from entering the avoidance area 50 by mistake.

A flowchart in FIG. 9 will be described. Since steps S300 to S304 in FIG. 9 are the same as steps S200 to S204 in FIG. 5 described above, description thereof is omitted. Since parts (a) to (d) in FIG. 11 correspond to the parts (a) to (d) in FIG. 7. In the part (d) in FIG. 11, the icon 40TG is in the selected state 42S.

In step S306 in FIG. 9 (after the finger 11F leaves the icon 40 after the icon 40 enters into the selected state 42S), the processor 24 waits until predetermined avoidance time TC elapses. In this case, the processor 24 determines whether the finger 11F of the user is detected in the space above the avoidance area 50 before the elapse of the avoidance time TC.

If the result of step S306 is No (the finger 11F is not detected above the avoidance area 50), the processor 24 causes, in step S308, the selected icon to enter into the definitively selected state 42SD at the time point of the elapse of the avoidance time TC as illustrated in a part (e-1) in FIG. 11. In step S310, the processor 24 receives an instruction for the definitively selected icon. For example, the processor 24 receives an instruction to display the next menu and performs control to display the next menu on the touch panel 16 as illustrated in a part (f) in FIG. 11. The processor 24 performs steps S300 to S312 also for the next menu. The processing thereof is the same as that in the exemplary embodiment described above.

In contrast, if the result of step S306 is Yes (the finger 11F is detected above the avoidance area 50), the processor 24 cancels, in step S312, the selected state 42S of the icon 40TG as illustrated in a part (e-2) in FIG. 11 at the time point of detecting the finger 11F above the avoidance area 50. The processor 24 then returns to step S300 and waits again with the unchanged menu until the finger 11F of the user comes to the space above the icon 40. Here, the description of the processing in the noncontact mode according to the different exemplary embodiment is completed.

According to the exemplary embodiment described above, even if the user causes the icon 40 to enter into the selected state 42S by mistake, the definitive selection of the icon 40 may be avoided.

Processing in Noncontact Mode according to Modification

Figure 12:
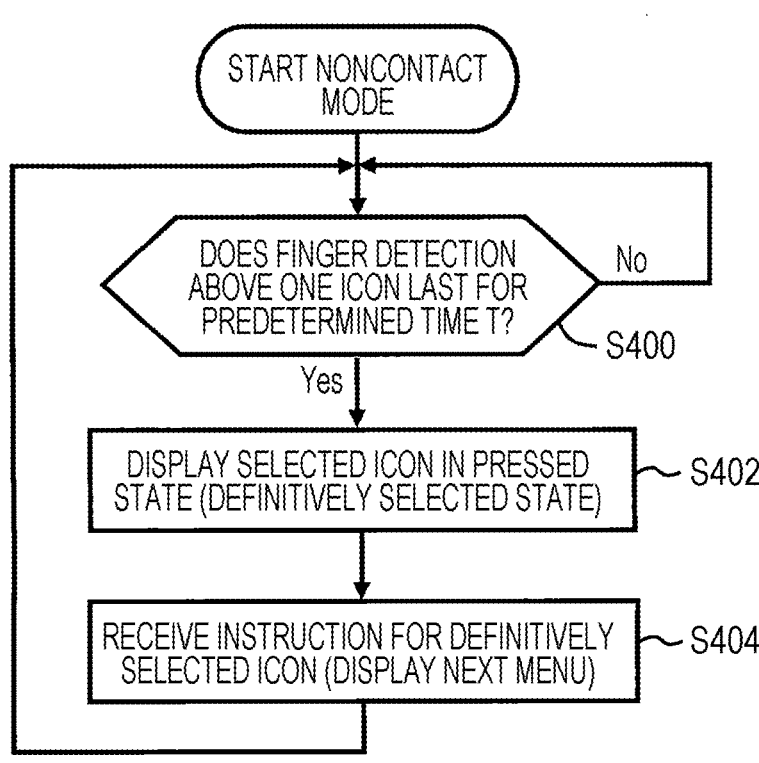
FIG. 12 is a flowchart illustrating processing in the noncontact mode according to a modification.
Figure 13:
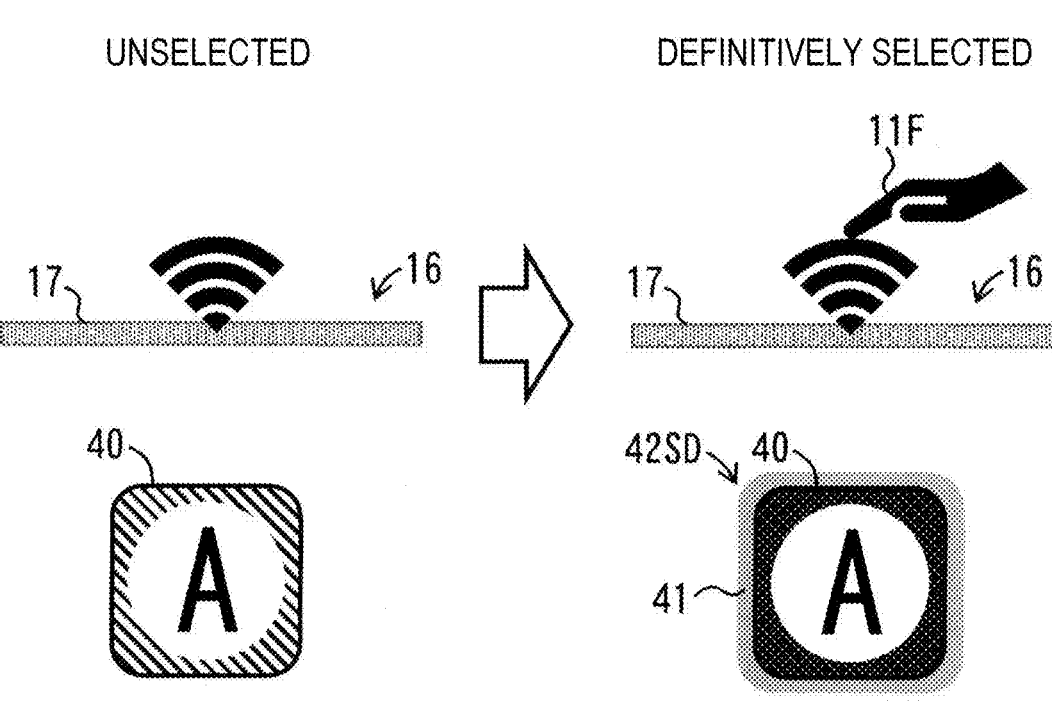
FIG. 13 is a view for explaining the definitively selected state of an icon in the noncontact mode according to the modification.
Figure 14:
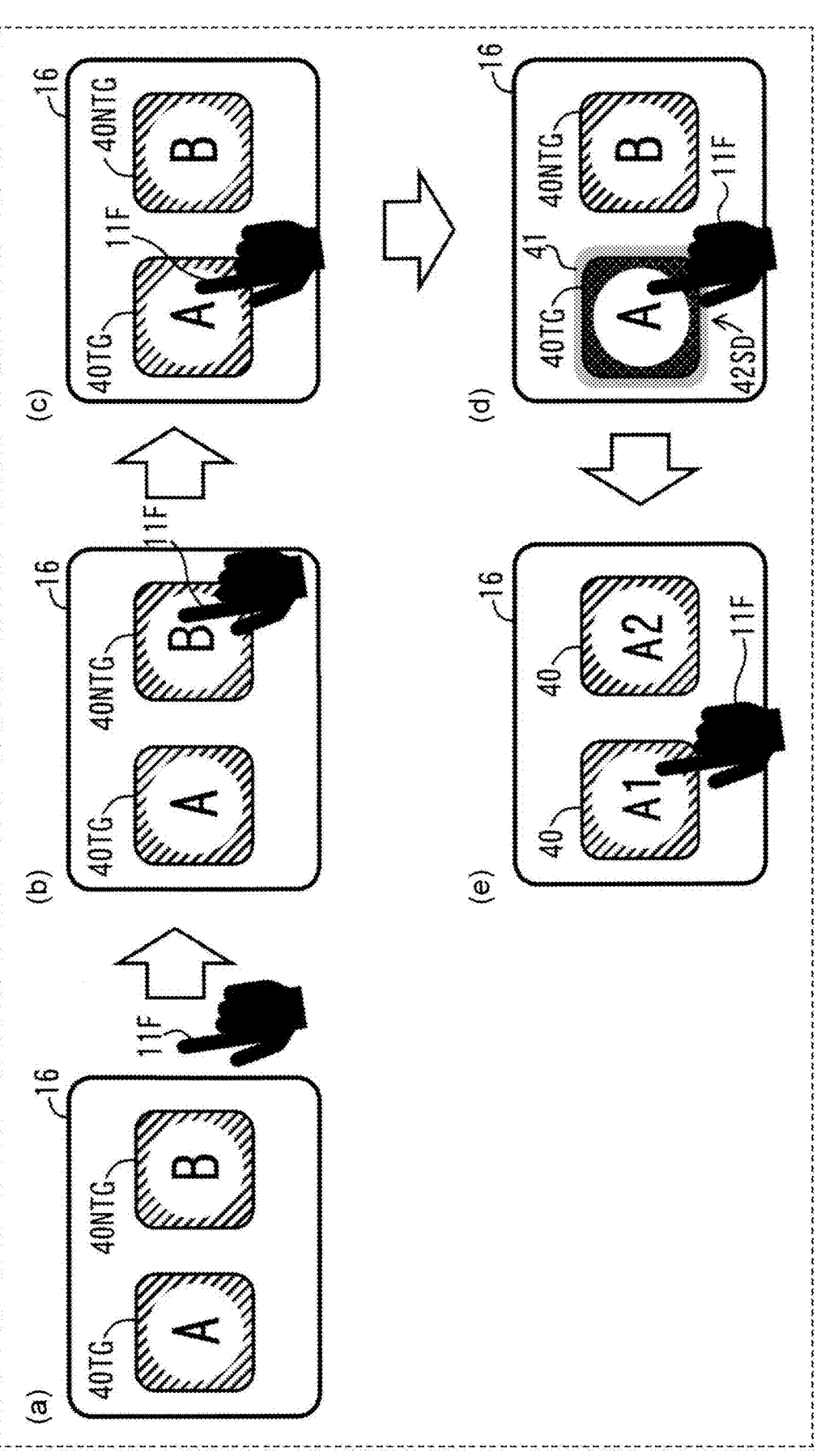
FIG. 14 is a view for explaining touch panel operations in the noncontact mode according to the modification.

Processing in the noncontact mode according to a modification will then be described. FIG. 12 is a flowchart illustrating the processing in the noncontact mode according to the modification. FIG. 13 is a view for explaining the definitively selected state 42SD of one of the icons 40 in the noncontact mode. FIG. 14 is a view for explaining touch panel operations in the noncontact mode.

In the modification, the selected state 42S of the icon 40 is omitted, and the icon 40 is set in the definitively selected state 42SD if the detection of the finger 11F of the user above the area of one of the icons 40 lasts for the predetermined time T. Points other than the above are the same as those in the exemplary embodiment described above with reference to FIG. 7. FIG. 14 illustrates the same parts (a) to (c) as those (a) to (c) in FIG. 7 described above.

The flowchart in FIG. 12 will be described. In step S400, the processor 24 of the MFP 10 determines whether the detection of the finger 11F of the user above the area of one of the icons 40 displayed on the touch panel 16 lasts for the predetermined time T (the finger stay state is detected). If the result of step S400 is Yes (the finger stay state is detected), the processor 24 performs control of the touch panel 16 in step S402 to cause the icon 40 below the finger 11F of the user to enter into the definitively selected state 42SD as illustrated in FIG. 13 and a part (d) in FIG. 14. In step S404, the processor 24 receives an instruction for the definitively selected icon. For example, the processor 24 receives an instruction to display the next menu and performs control to display the next menu on the touch panel 16 as illustrated in a part (e) in FIG. 14. The processor 24 performs steps S400 to S404 also for the next menu. Here, the description of the processing in the noncontact mode according to the modification is completed.

According to the modification described above, the target icon 40TG may also be selected in the noncontact mode without the finger 11F of the user touching the surface of the touch panel 16.

Customizing Touch Panel Displaying

Customizing the touch panel displaying will then be described. FIG. 15 is a view illustrating an example of customizing the touch panel displaying. The MFP 10 stores, in the memory 26 in advance, user information in which user identification information (such as a user A or B) is related to settings information. The settings information includes touch panel information. The touch panel information is information indicating the icons 38 to be displayed in the contact mode and the icons 40 to be displayed in the noncontact mode, as illustrated in FIG. 15.

The MFP 10 performs user authentication in such a manner that the reader 14 reads the user identification information in the IC card 12 when the IC card 12 is held out over the reader 14. The user authentication is performed by checking the user information with the user identification information read from the IC card 12. In the user authentication, the processor 24 acquires, from the user information, the touch panel information related to the user identification information stored in the IC card 12 and performs control of the displaying of the touch panel 16 on the basis of the touch panel information.

The touch panel displaying may be changed (customized) on a per-user basis such as for the user A or the user B in FIG. 15 by changing the user information (touch panel information) stored in the MFP 10. For example, an administrator of the MFP 10 or each user operates the touch panel 16 of the MFP 10, and thereby the user information may be changed.

Each icon 40 to be displayed on the touch panel 16 is larger in the noncontact mode than in the contact mode, and a smaller number of icons 40 are displayed thereon. Accordingly, the touch panel information is set to display, for example, a frequently used icon as the icon 40 in the noncontact mode, depending on the user. In FIG. 15, the touch panel displaying is customized for the user B to display icons L and E in the noncontact mode (print job absent).

Each user gives a printing instruction by operating a terminal apparatus such as a personal computer (PC), and a print job is thereby transmitted from the terminal apparatus to the MFP 10. The print job includes identification information regarding the user who has given the printing instruction. In one of modes of security printing, the MFP 10 receives a print job, user authentication is thereafter performed in such a manner that the user who has given the printing instruction holds out the IC card 12 over the reader 14, and thereby a print job related to the user identification information stored in the IC card 12 is displayed on the touch panel 16. In response to the user giving a printing execution instruction by designating a print job on the touch panel 16, the MFP 10 starts printing.

In the fields in the column of the noncontact mode (print job present) in FIG. 15 and for the user A and the user B, print job icons 45 (icons including a job name) for a printing execution instruction are displayed on the touch panel 16. Each print job icon 45 includes attribute information of a print job, such as the number of printed pages, a sheet size, sheet type, and the like (only part thereof is illustrated). Since a smaller number of icons are displayed on the touch panel 16 in the noncontact mode, at least one of the icons 40 to be displayed in the noncontact mode (print job absent) is possibly to be replaced with a print job icon 45, as illustrated in FIG. 15, to display the print job icons 45 in the noncontact mode (print job present). One or more icons 40 among the icons 40 to be displayed in the noncontact mode (print job absent) are to be preferentially replaced with the print job icon 45 in the noncontact mode (print job present). Information indicating the one or more icons 40 may be set in the touch panel information.

Note that in the user information stored in the MFP 10, the touch panel information is not necessarily to be related to every user, and touch panel information (default in FIG. 15) common to the users may be applied to a user not related thereto.

Other Information Processing Apparatuses

The MFP 10 serves as the information processing apparatus in the exemplary embodiments above, but other examples of the information processing apparatus include a smartphone, a tablet, an ATM of a bank, a ticket machine, and a payment machine. In the ATM of a bank, holding out a cash card serving as the storage medium over the reader enables selection of the contact mode or the noncontact mode. Reading information stored in the cash card with the reader also enables identification of a user who operates the touch panel. Note that the user identification is not limited to the identification of the user themselves and includes identification of an attribute such as the age or sex of the user.

In the railway ticket machine, holding out an IC card ticket serving as the storage medium over the reader enables selection of the contact mode or the noncontact mode. Reading information stored in the IC card ticket with the reader also enables identification of a user who operates the touch panel. By identifying the user, the information processing apparatus may vary the touch panel displaying and the predetermined time T serving as the criterion for the finger stay state described above, depending on the user.

Others

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
    detect a finger of a user in a state of not touching a display, the display displaying a plurality of icons;
    determine whether the finger remains in a space corresponding to, and not touching, a first icon of the plurality of icons for a predetermined time or longer;
    in response to determining that the finger remains in the space for the predetermined time or longer, receive an instruction selecting the first icon upon the finger leaving the space; and
    in response to determining that the finger does not remain in the space for the predetermined time or longer, not receive the instruction selecting the first icon upon the finger leaving the space, wherein
the instruction selecting the first icon is automatically received in response to only determining that (i) the finger remains in the space for the predetermined time or longer and (ii) the finger leaves the space.

2. The information processing apparatus according to claim 1, wherein the processor is configured to:
    perform control of the display, when the state is detected, to turn the first icon into a first selected display form.

3. The information processing apparatus according to claim 2,
wherein the processor is configured to:
    in response to determining that the finger moves from the space corresponding to the first icon to a space above an avoidance area displayed on the display after the first icon turns into the first selected display form, consider that definitive selection of the first icon is avoided and not receive the instruction selecting the first icon.

4. The information processing apparatus according to claim 1,
wherein the processor is configured to:
    perform switching between a contact mode and a noncontact mode, the contact mode being a mode in which the first icon turns into a first selected display form in response to a touch on the display, the noncontact mode being a mode in which the first icon turns into the first selected display form without the touch; and
    perform display control of the display to make larger the first icon to be displayed on the display in the noncontact mode than in the contact mode.

5. The information processing apparatus according to claim 2,
wherein the processor is configured to:
    perform switching between a contact mode and a noncontact mode, the contact mode being a mode in which the first icon turns into the first selected display form in response to a touch on the display, the noncontact mode being a mode in which the first icon turns into the first selected display form without the touch; and
    perform display control of the display to make larger the first icon to be displayed on the display in the noncontact mode than in the contact mode.

6. The information processing apparatus according to claim 3,
wherein the processor is configured to:
    perform switching between a contact mode and a noncontact mode, the contact mode being a mode in which the first icon turns into the first selected display form in response to a touch on the display, the noncontact mode being a mode in which the first icon turns into the first selected display form without the touch; and
    perform display control of the display to make larger the first icon to be displayed on the display in the noncontact mode than in the contact mode.

7. The information processing apparatus according to claim 1,
wherein the processor is configured to:
    perform switching between a contact mode and a noncontact mode, the contact mode being a mode in which the first icon turns into a first selected display form in response to a touch on the display, the noncontact mode being a mode in which the first icon turns into the first selected display form without the touch; and
    perform display control of the display to make longer a distance between the plurality of icons to be displayed on the display in the noncontact mode than in the contact mode.

8. The information processing apparatus according to claim 2, wherein the processor is configured to:

perform switching between a contact mode and a noncontact mode, the contact mode being a mode in which the first icon turns into the first selected display form in response to a touch on the display, the noncontact mode being a mode in which the first icon turns into the first selected display form without the touch; and perform display control of the display to make longer a distance between the plurality of icons to be displayed on the display in the noncontact mode than in the contact mode.

9. The information processing apparatus according to claim 3, wherein the processor is configured to:

perform switching between a contact mode and a noncontact mode, the contact mode being a mode in which the first icon turns into the first selected display form in response to a touch on the display, the noncontact mode being a mode in which the first icon turns into the first selected display form without the touch; and perform display control of the display to make longer a distance between the plurality of icons to be displayed on the display in the noncontact mode than in the contact mode.

10. The information processing apparatus according to claim 1, wherein the processor is configured to:

perform control of the display to cause the display to operate in a contact mode in response to approach of a storage medium to a reader being detected within a period of time shorter than the predetermined time and to cause the display to operate in a noncontact mode in response to the approach of the storage medium to the reader being detected within the predetermined time or longer, the contact mode being a mode in which the first icon turns into a first selected display form in response to a touch on the display, the noncontact mode being a mode in which the first icon turns into the first selected display form without the touch on the display.

11. The information processing apparatus according to claim 2, wherein the processor is configured to:

perform control of the display to cause the display to operate in a contact mode in response to approach of a storage medium to a reader being detected within a period of time shorter than the predetermined time and to cause the display to operate in a noncontact mode in response to the approach of the storage medium to the reader being detected within the predetermined time or longer, the contact mode being a mode in which the first icon turns into the first selected display form in response to a touch on the display, the noncontact mode being a mode in which the first icon turns into the first selected display form without the touch on the display.

12. The information processing apparatus according to claim 3, wherein the processor is configured to:

perform control of the display to cause the display to operate in a contact mode in response to approach of a storage medium to a reader being detected within a period of time shorter than the predetermined time and to cause the display to operate in a noncontact mode in response to the approach of the storage medium to the reader being detected within the predetermined time or longer, the contact mode being a mode in which the first icon turns into the first selected display form in response to a touch on the display, the noncontact mode being a mode in which the first icon turns into the first selected display form without the touch on the display.

13. The information processing apparatus according to claim 4, wherein the processor is configured to:

perform control of the display to cause the display to operate in the contact mode in response to approach of a storage medium to a reader being detected within a period of time shorter than the predetermined time and to cause the display to operate in the noncontact mode in response to the approach of the storage medium to the reader being detected within the predetermined time or longer, the contact mode being the mode in which the first icon turns into the first selected display form in response to the touch on the display, the noncontact mode being the mode in which the first icon turns into the first selected display form without the touch on the display.

14. The information processing apparatus according to claim 5, wherein the processor is configured to:

perform control of the display to cause the display to operate in the contact mode in response to approach of a storage medium to a reader being detected within a period of time shorter than the predetermined time and to cause the display to operate in the noncontact mode in response to the approach of the storage medium to the reader being detected within the predetermined time or longer, the contact mode being the mode in which the first icon turns into the first selected display form in response to the touch on the display, the noncontact mode being the mode in which the first icon turns into the first selected display form without the touch on the display.

15. The information processing apparatus according to claim 6, wherein the processor is configured to:

perform control of the display to cause the display to operate in the contact mode in response to approach of a storage medium to a reader being detected within a period of time shorter than the predetermined time and to cause the display to operate in the noncontact mode in response to the approach of the storage medium to the reader being detected within the predetermined time or longer, the contact mode being the mode in which the first icon turns into the first selected display form in response to the touch on the display, the noncontact mode being the mode in which the first icon turns into the first selected display form without the touch on the display.

16. The information processing apparatus according to claim 7, wherein the processor is configured to:

perform control of the display to cause the display to operate in a contact mode in response to approach of a storage medium to a reader being detected within a period of time shorter than the predetermined time and to cause the display to operate in a noncontact mode in response to the approach of the storage medium to the reader being detected within the predetermined time or longer, the contact mode being a mode in which the first icon turns into the first selected display form in response to a touch on the display, the noncontact mode being a mode in which the first icon turns into the first selected display form without the touch on the display.

17. The information processing apparatus according to claim 1, wherein the processor is configured to:

perform control to cause the information processing apparatus to operate in a contact mode in response to approach of a storage medium to a reader being detected within the predetermined time or longer and to cause the information processing apparatus to operate in a noncontact mode in response to the approach of the storage medium to the reader being detected within a period of time shorter than the predetermined time, the contact mode being a mode in which the first icon turns into a first selected display form in response to a touch on the display, the noncontact mode being a mode in which the first icon turns into the first selected display form without the touch on the display.

18. The information processing apparatus according to claim 1, wherein the processor is configured to:

perform control of the display to perform switching between a contact mode and a noncontact mode every time approach of a storage medium to a reader is detected, the contact mode being a mode in which the first icon turns into a first selected display form in response to a touch on the display, the noncontact mode being a mode in which the first icon turns into the first selected display form without the touch on the display.

19. A non-transitory computer readable medium storing a program causing a computer to execute a process comprising:

detecting a finger of a user in a state of not touching a display, the display displaying a plurality of icons;

determining whether the finger remains in a space corresponding to, and not touching, a first icon of the plurality of icons for a predetermined time or longer;

in response to determining that the finger remains in the space for the predetermined time or longer, receiving an instruction selecting the first icon upon the finger leaving the space; and in response to determining that the finger does not remain in the space for the predetermined time or longer, not receiving the instruction selecting the first icon upon the finger leaving the space, wherein the instruction selecting the first icon is automatically received in response to only determining that (i) the finger remains in the space for the predetermined time or longer and (ii) the finger leaves the space.

20. An information processing method comprising:

detecting a finger of a user in a state of not touching a display, the display displaying a plurality of icons;

determining whether the finger remains in a space corresponding to, and not touching, a first icon of the plurality of icons for a predetermined time or longer;

in response to determining that the finger remains in the space for the predetermined time or longer, receiving an instruction selecting the first icon upon the finger leaving the space; and in response to determining that the finger does not remain in the space for the predetermined time or longer, not receiving the instruction selecting the first icon upon the finger leaving the space, wherein the instruction selecting the first icon is automatically received in response to only determining that (i) the finger remains in the space for the predetermined time or longer and (ii) the finger leaves the space.

* * * * *